(12) United States Patent
Vaudreuil (10) Patent No.: US 9,767,692 B1
(45) Date of Patent: Sep. 19, 2017

(54) VEHICLE AND ENVIRONMENTAL DATA ACQUISITION AND CONDITIONED RESPONSE SYSTEM

(71) Applicant: Louvena Vaudreuil, Lakeworth, FL (US)

(72) Inventor: Louvena Vaudreuil, Lakeworth, FL (US)

( * ) Notice: Subject to any disclaimer, the term of this patent is extended or adjusted under 35 U.S.C. 154(b) by 0 days.

(21) Appl. No.: 14/750,489

(22) Filed: Jun. 25, 2015

Related U.S. Application Data

(60) Provisional application No. 62/016,922, filed on Jun. 25, 2014.

(51) Int. Cl.
| | |
|---|---|
| *G01M 17/00* | (2006.01) |
| *G06F 7/00* | (2006.01) |
| *G06F 19/00* | (2011.01) |
| *G08G 1/16* | (2006.01) |
| *G01B 11/14* | (2006.01) |
| *G07C 5/08* | (2006.01) |
| *G08G 1/097* | (2006.01) |
| *H04N 7/18* | (2006.01) |

(52) U.S. Cl.
CPC .............. *G08G 1/16* (2013.01); *G01B 11/14* (2013.01); *G07C 5/0841* (2013.01); *G08G 1/097* (2013.01); *H04N 7/181* (2013.01)

(58) Field of Classification Search
USPC ........................................................ 701/301
See application file for complete search history.

(56) References Cited

U.S. PATENT DOCUMENTS

| | | | | |
|---|---|---|---|---|
| 2,959,671 | A | | 11/1960 | Stevinson |
| 4,447,752 | A | * | 5/1984 | Boyce .................... H01R 39/08 310/232 |
| 4,688,244 | A | * | 8/1987 | Hannon ................. G01C 21/22 235/375 |
| 4,750,197 | A | * | 6/1988 | Denekamp ............. G07C 5/008 235/375 |
| 5,179,877 | A | * | 1/1993 | Down ................ H01R 13/6397 81/442 |
| 5,273,444 | A | * | 12/1993 | Down ................ H01R 13/6397 439/133 |
| 5,731,227 | A | * | 3/1998 | Thomas ........... H01L 23/49827 257/E23.063 |
| 5,927,165 | A | * | 7/1999 | Vasudeva .............. B25B 23/108 81/442 |
| 5,946,404 | A | * | 8/1999 | Bakshi ............ G08B 13/19619 16/383 |
| 6,009,366 | A | * | 12/1999 | Burkhard .............. B60T 8/1764 180/197 |

(Continued)

FOREIGN PATENT DOCUMENTS

| | | |
|---|---|---|
| CN | 202703577 U | 1/2013 |
| EP | 0087398 A2 | 8/1983 |

(Continued)

*Primary Examiner* — Jean-Paul Cass
(74) *Attorney, Agent, or Firm* — Robert C. Montgomery; Montgomery Patent and Design, L.P.

(57) ABSTRACT

An apparatus is adapted to be in electro-mechanically communication with a vehicle and configured to record information related to crash investigation and early warning. The device records and stores information as well as analyzes it to provide an occupant of the vehicle early warning as to potential hazards that arise.

2 Claims, 5 Drawing Sheets

(56) References Cited

U.S. PATENT DOCUMENTS

| | | | | |
|---|---|---|---|---|
| 6,102,492 | A * | 8/2000 | Diehle | B60T 8/1766 188/349 |
| 6,203,122 | B1 * | 3/2001 | Ehmer | B60T 8/1766 188/369 |
| 6,334,791 | B1 * | 1/2002 | Yeh | H01R 13/6616 333/185 |
| 6,379,798 | B1 * | 4/2002 | Yazaki | C23C 14/0015 428/408 |
| 6,460,941 | B1 * | 10/2002 | Zenzen | B60T 8/1764 303/122 |
| 6,491,546 | B1 * | 12/2002 | Perry | H01R 24/542 439/133 |
| 6,928,356 | B2 * | 8/2005 | Inoue | B60T 8/17636 303/173 |
| 7,047,121 | B2 * | 5/2006 | Inoue | B60T 8/17636 303/173 |
| 7,278,694 | B2 * | 10/2007 | Choi | B60T 8/17616 303/156 |
| 7,328,092 | B2 * | 2/2008 | Eggert | B60K 31/042 701/31.7 |
| 8,054,203 | B2 * | 11/2011 | Breed | B60C 11/24 340/425.5 |
| 8,982,670 | B1 * | 3/2015 | Pappafotis | F41H 11/16 367/124 |
| 2003/0084290 | A1 * | 5/2003 | Murty | H04L 63/0428 713/168 |
| 2005/0029652 | A1 * | 2/2005 | Cuff | H01L 23/367 257/712 |
| 2005/0203931 | A1 * | 9/2005 | Pingree | G06F 17/30997 |
| 2006/0136575 | A1 * | 6/2006 | Payne | G07C 9/00087 709/219 |
| 2009/0280018 | A1 * | 11/2009 | Ichiyanagi | F04C 18/0215 418/55.1 |
| 2010/0143742 | A1 * | 6/2010 | Tsypine | B22D 19/00 428/600 |
| 2012/0105637 | A1 * | 5/2012 | Yousefi | H04N 7/183 348/148 |
| 2012/0166037 | A1 | 6/2012 | Santolalla et al. | |
| 2012/0173900 | A1 * | 7/2012 | Diab | H04L 12/10 713/310 |
| 2012/0173905 | A1 * | 7/2012 | Diab | H04L 12/66 713/320 |
| 2012/0298645 | A1 * | 11/2012 | Kleespiess | H01R 4/029 219/137 R |
| 2012/0303215 | A1 * | 11/2012 | Kim | G01D 9/005 701/36 |
| 2012/0323449 | A1 | 12/2012 | Kim et al. | |
| 2012/0323490 | A1 | 12/2012 | Kim et al. | |
| 2012/0326917 | A1 | 12/2012 | Kiehne | |
| 2013/0069802 | A1 | 3/2013 | Foghel et al. | |
| 2015/0213195 | A1 * | 7/2015 | Blechman | G06F 19/322 705/51 |
| 2015/0232065 | A1 * | 8/2015 | Ricci | B60R 25/01 701/36 |
| 2015/0245167 | A1 * | 8/2015 | Bobrow | H04W 4/008 455/41.2 |
| 2015/0367415 | A1 * | 12/2015 | Buller | B23K 26/346 419/53 |

FOREIGN PATENT DOCUMENTS

| | | |
|---|---|---|
| WO | 2004002613 A3 | 2/2004 |
| WO | 2012148296 A1 | 11/2012 |
| WO | 2013187874 A1 | 12/2013 |

* cited by examiner

VEHICLE AND ENVIRONMENTAL DATA ACQUISITION AND CONDITIONED RESPONSE SYSTEM

RELATED APPLICATIONS

The present invention was first described in and claims the benefit of U.S. Provisional Application No. 62/016,922 filed Jun. 25, 2014, the entire disclosures of which are incorporated herein by reference.

FIELD OF THE INVENTION

The present invention relates to a system for monitoring and recording pertinent information about an operable machine and parameters that may influence such operation.

BACKGROUND OF THE INVENTION

Automobile accidents are among the leading cause of injury and death in the United States today. While using the appropriate safety devices and following safe driving practices often helps to reduce the frequency of automobile accidents and the results thereof, the inescapable fact is that accidents will always be a part of modern day life—as the infinite number of factors that bring about a traffic accident can never be fully accounted for or avoided.

It is due to this randomness that both medical insurance and automotive insurance fraud are relatively easy to commit and difficult to uncover. Almost anyone can claim some type of damage to his or her person or his or her vehicle with virtually no proof of how the damage happened. This type of fraud occurs with great regularity and causes insurance rates to rise for the entire pool of insured drivers. Accordingly, there exists a need for a means by which proof related to legitimate accidents can be both acquired and provided to an insurer in an effort to reduce insurance fraud. The development of the present invention fulfills this need.

SUMMARY OF THE INVENTION

The inventor has recognized the aforementioned inherent problems and lack in the art and observed that there is a need for a system for monitoring and recording pertinent information about an operable machine and parameters.

It is therefore an object of the invention to provide a data recorder system, comprising a box, a processor secured within the box, a memory device secured within the box and in electrical communication with the processor, an input/output interface secured within the box and in electrical communication with the processor, a plurality of connection ports in electrical communication with the input/output interface, a plurality of interface ports in electrical communication with the memory device permitting programming of the memory device and data retrieval therefrom.

There is a plurality of monitoring sensors disposed on a vehicle, each in communication with the processor and the memory device and configured to detect event parameter data by means of the connection ports. There is also a plurality of monitoring cameras disposed on the vehicle, each in communication with the processor and the memory device and configured to detect additional event parameter data by means of the connection ports. There is software configured to be stored by and operated upon the processor to identify event parameters, acquisition the event parameter data, the additional event parameter data, coalesce the event parameter data and the additional event parameter data, and store the coalesced event parameter data and the additional event parameter data on the memory device.

The event parameter data and the additional event parameter data provides information regarding movement, movement relative to other objects within proximity, and environmental conditions and the software is configured to establish drive campaigns and sample, store, and purge the event parameter data and the additional event parameter data in accordance with each individual drive campaign.

The software also may be configured to detect imminent collision with other objects through a collision alert algorithm and provide warnings thereof via communication with an alarm and is configured to store event parameter data and the additional event parameter data without purging the event parameter data and the additional event parameter data through a snapshot recordation algorithm when damage has been detected.

The box comprises a laminated construction of insulative and conductive materials and also comprises layers of strong and hard materials. The box is further provided with a locking mechanism configured to selectively grant access to the processor and the memory device and to transmit a signal to the processor and the memory device each time the locking mechanism is activated.

There are breach sensors and breach monitors within the box, each configured to detect and record any breach that has occurred into the box and transmit the detection and recordation to the processor for storage of and on the memory device and encrypted access coding and breach detection algorithms included with the software to prevent and detect access to the processor and the memory device. Encrypted access coding and breach detection algorithms may also be provided to prevent and detect access to the processor and the memory device. The communication between the plurality of monitoring sensors, the plurality of monitoring cameras, and the box is provided by coaxial cable lines and tamper-resistance cable terminators.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 system
11 vehicle 12 vehicle computer
20 tamperproof box
30 processor
40 memory device
50 monitoring sensor
60 monitoring camera
70 locking mechanism
80 breach sensor
90 breach camera
100 software
110 event parameter
130 snapshot recordation
120 collision alert
140 alarm
300 protective enclosure
305 protective layer barriers
310 input/output interface
315 connection ports
320 interface ports
400 start function
405 first decision function
406 first decision first sub function
407 first decision second sub function
408 first decision third sub function
410 first operational function
415 second operational function
416 second operation first sub function
420 second decision function
421 second decision first sub function
425 first write function
430 third decision function
431 third decision first sub function
432 third decision second sub function
435 third operation function
440 fourth operation function
445 second write function
450 fifth operation function
455 fourth decision function
456 fourth decision first sub function
457 first decision second sub function
460 sixth operation function
465 fifth decision function
470 seventh operation function
475 third write function

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under the scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a network of monitoring sensors 50 and monitoring cameras 60 (herein referred to as the "system") 10, which tracks data in the form of event parameters 110 to process and store such data in a tamperproof box 20 for subsequent acquisitioning, analysis, and manipulation.

Figure 1:
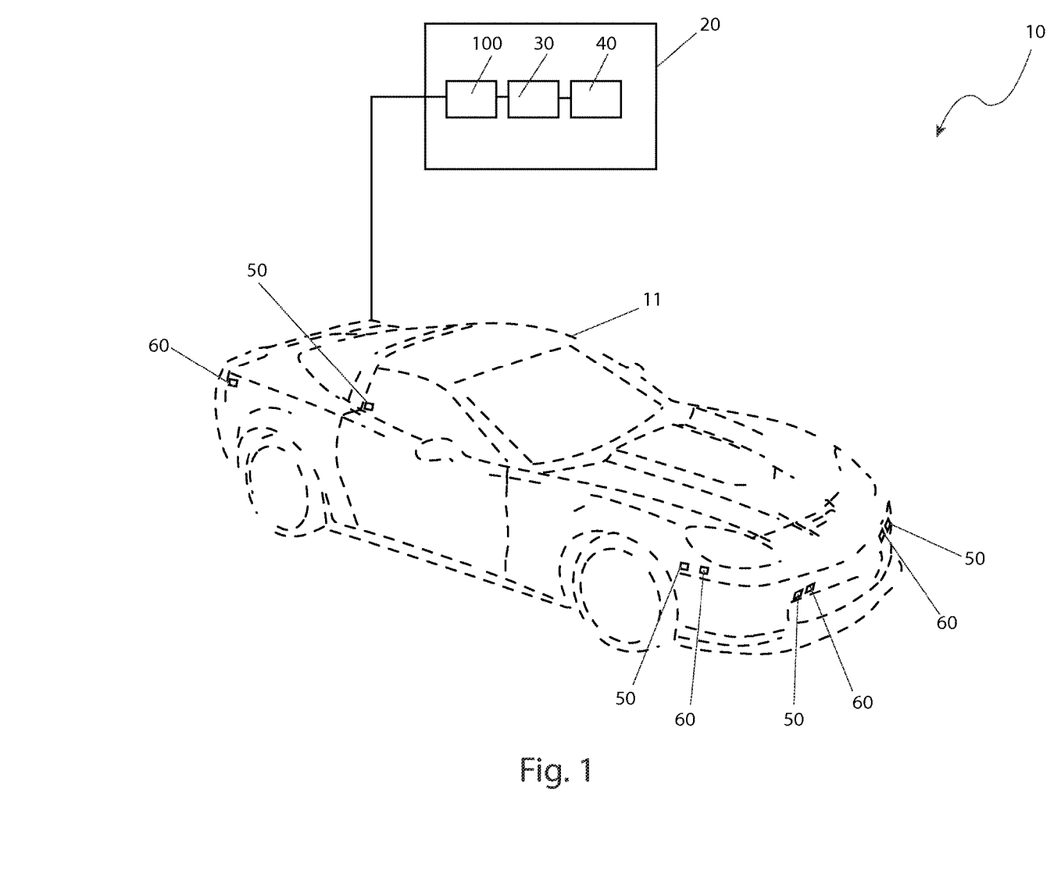
FIG. 1 is an environmental view of a vehicle and environmental data acquisition and conditioned response system 10 showing sensors 50 and cameras 60 on an exterior of a vehicle 12, in accordance with the preferred embodiment of the present invention.
Figure 2:
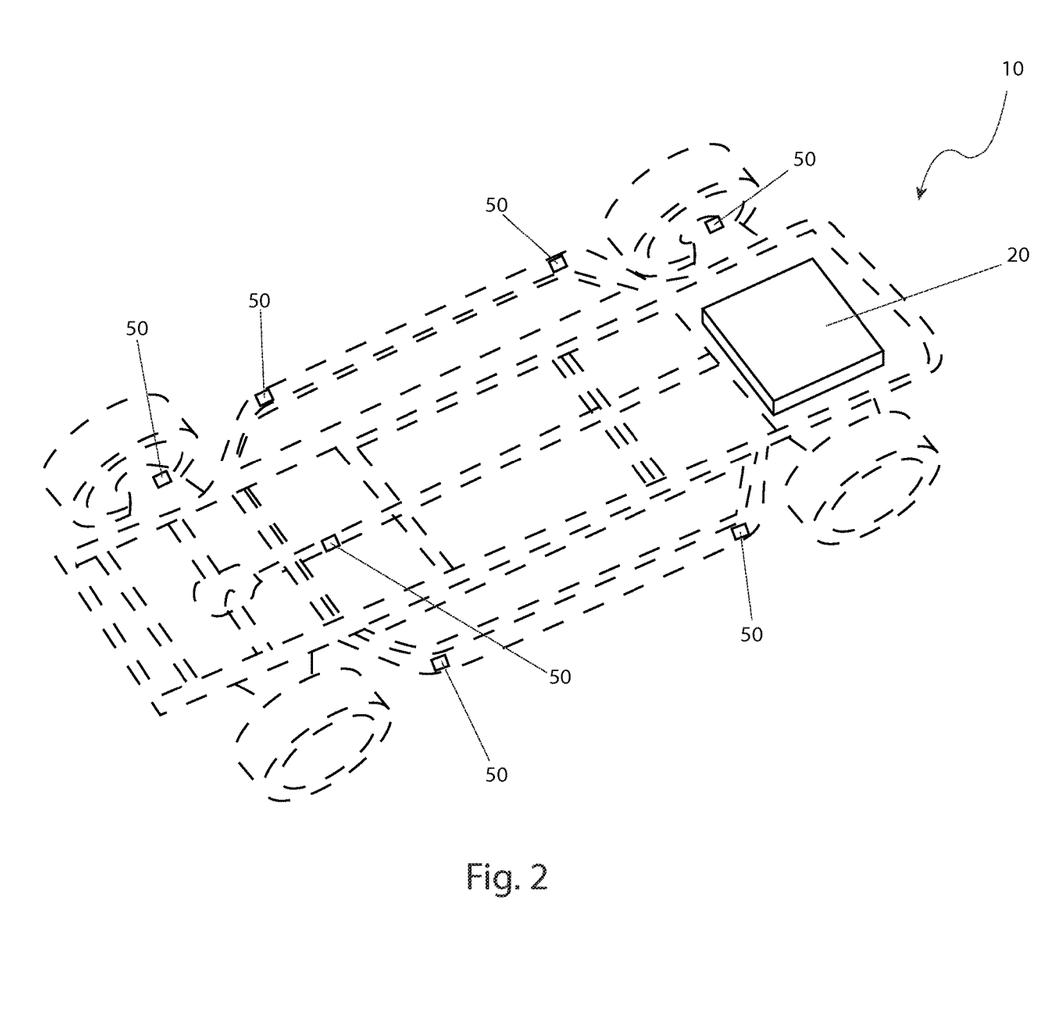
FIG. 2 is an environmental view of the system 10 showing sensors and cameras 50 on an interior of a vehicle 12, in accordance with the preferred embodiment of the present invention.

Referring now to FIGS. 1 and 2, environmental views of the system 10, in accordance with the preferred embodiment of the present invention, are disclosed. The system 10 provides a means to record pertinent data regarding the operation of a vehicle 11, or other operable machine, and the movements of that vehicle 11 relative to other objects within proximity of that vehicle 11. The system is particularly beneficial when that vehicle 11 experiences a collision or is damaged; however, the system 10 may be useful in other applications. The system 10 is further configured to provide an early warning to an operator when a collision is imminent. To achieve this, the vehicle 11 is equipped with a multitude of sensors 50 and cameras 60 that detect all pertinent aspects of vehicle's 11 operations such as throttle position, steering angle, brake activation, air bag activation, seat belt usage, and the like. This information is recorded onto a memory device 40 housed within a tamperproof enclosure 20, which can withstand high impacts, water, and fire. Such information can be reviewed by medical personnel, insurance adjusters, and the like to help prevent fraud and reduce overall insurance costs for all. Additionally, the system 10 is equipped with a series of cameras 60, radar and/or ultrasonic sensors 50 around the perimeter of the vehicle 11 to detect approaching objects. The system 10 then tracks and records the positions and movements of these objects (relative to the vehicle) for the same purposes as described above, but also sounds an alert in the passenger compartment to help warn the driver to possibly take avoidance action.

The system 10 comprises a tamperproof box 20 housing a processor 30 and a memory device 40, which are coupled to a plurality of monitoring sensors 50 and monitoring cameras 60 residing outside of the tamperproof box 20. This processor 30 is an integrated circuit capable of being programmed by software 100 to accept inputs and performs input/output functions in accordance with algorithmic functions set forth by the software 100. Storage of the software 100 may be on the processor 30 or on the memory device 40. Data storage by the system 10 occurs on the memory device 40 such as a RAM or other common memory storage device accessible by the processor 30 for execution thereupon. The tamperproof box 20 is envisioned to have a laminated construction of insulative and conductive material, much like coaxial cable, to provide protection from destruction and from interference, manipulation, and sampling. The conductive materials create a Faraday cage construction preventing electro-magnetic interference, sampling, or manipulation of data. Insulative materials provide protection from heat, electricity, and other environmental elements that may pose a destructive threat to the tamperproof box 20.

The tamperproof box 20 is further provided with alternating layers of very strong and very hard materials such as manganese steel alloys and tungsten carbide alloys to prevent deliberate access to the box 20. A locking mechanism 70 is provided to grant selective access to the processor 30 and memory device 40, which is configured to transmit a signal to the processor 30 each time it has been unlocked. The interior of the tamperproof box 20 is further provided with breach sensors 80 (such as position sensors, ultrasonic, or piezoelectric sensors) and breach cameras 90 that detect and record any breach that has occurred into the box 20 and signals the processor 30 for storage of such information on the memory device 40. The processor 30 and memory device 40 are further provided with encrypted access codes and breach detection algorithms via the software 100.

The system 10 is preferably employed with a vehicle 11; however, it is understood that the system 10 may be utilized in any situation where tracking and recordation of the operation and movements of an object, as well as tracking and recordation of another object's relative movement, is desired. In the case of use with a vehicle 11, the plurality of monitoring sensors 50 and cameras 60 are disposed throughout the interior and exterior of the vehicle 11.

Figure 3:
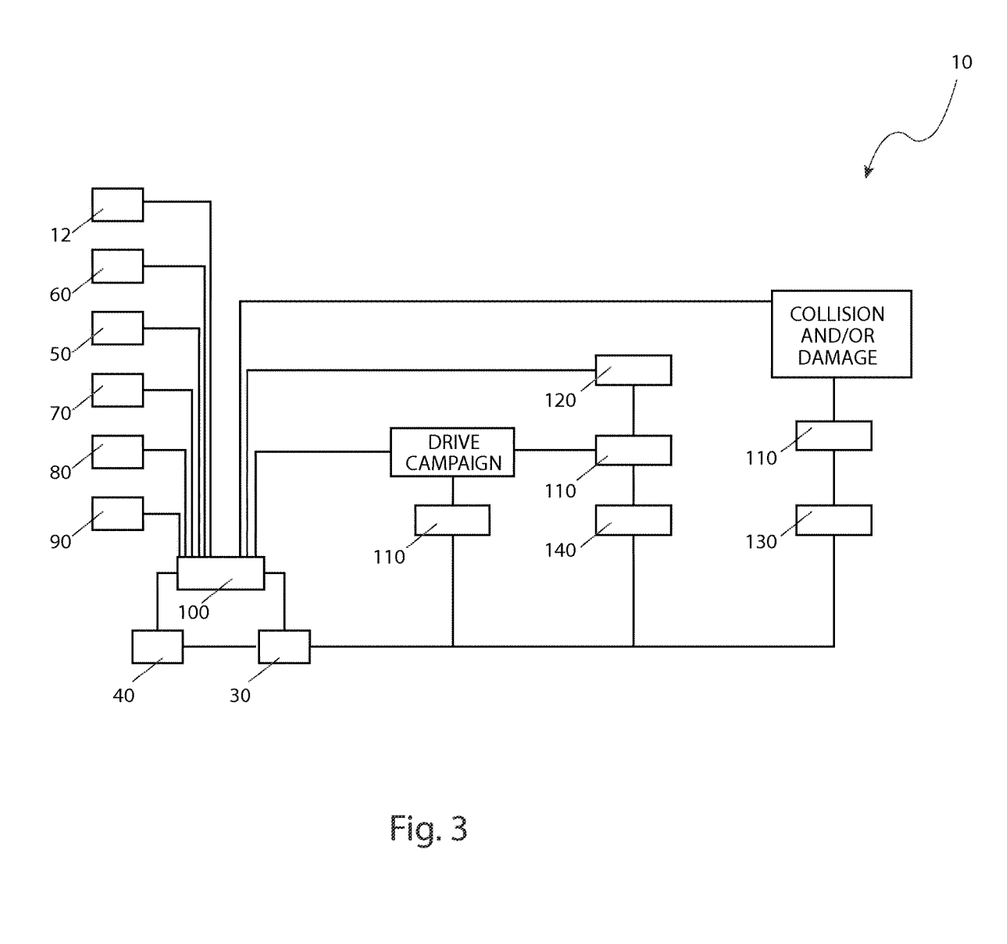
FIG. 3 is a block diagram of the system 10 in accordance with the preferred embodiment of the present invention.

Referring now to FIG. 3, a bock diagram of the system 10, in accordance with the preferred embodiment of the present invention, is disclosed. The monitoring sensors 50 are configured to record event parameters 110, either continuously or periodically depending upon commands by the processor 30 as dictated by the software 100. Most modern vehicles 11 employ an on-board processor/computer 12 to assist with the proper and efficient operation of the vehicle's engine and other components, and if the system 10 is used with such a vehicle 11 then the vehicle's computer 12 is further used as a monitoring sensor 50. The event parameters 110 are envisioned to comprise: date and time of day; ambient light; if/when headlights are activated; ambient temperature; if/when precipitation is occurring; if/when windshield wipers are activated; if/when braking is activated; if/when seatbelts are engaged; velocity of the vehicle 11; acceleration/deceleration of the vehicle 11; the gear with which the vehicle's transmission is engaged; camber angle of tires; tire pressures; tire turn angle; deformation vectors of certain framework parts; relative motion of objects within proximity of the vehicle 12; and, azimuth coordinates of the vehicle. The event parameters 110 listed above are not intended to be exhaustive, but only to provide an example of the types of event parameters 110 that are to be stored and analyzed by the system 10. In order to record such event parameters 110, an arrangement of monitoring sensors 50 comprising: GPS; accelerometers; gyroscopes; microwave emitters and Doppler shift indicators; passive infrared sensors; lasers; temperature sensors; pressure sensors; linear and rotary encoders; torque sensors; position sensors (crankshaft, throttle, variable reluctance, etc.); yaw-rate sensors; varimeters; and, occupancy sensors are used. Again, the above-list of monitoring sensors 50 is not intended to be exhaustive, but only provides an example of the types of sensors 50 that are to be employed to detect and record the data for the system 10.

In order to add robustness and redundancy to the system 10, multiple monitoring sensors 50 may be employed to record the same event parameter 110. For instance, a pressure sensor 50 coupled to the brake assembly may be used to detect and record if/when braking occurs, a position sensor 50 may be coupled to the brake pedal to detect and record if/when the brakes have been applied by the operator, and a volt-ammeter 50 may be coupled to the taillights to detect and record if/when a signal has been sent to the taillights to activate them.

In order to add efficiency to the system 10, the event parameter 110 data are sampled and stored only when it is foreseeable that such data will be important. It may not be necessary, or efficient, to continuously record the velocity of the vehicle 11, but to rather sample the velocity on a periodic basis. Whether to continuously record or to sample on a periodic basis will depend on the event parameter 110 and the type of analysis the software 100 is performing. It might be so that periodic sampling of a first event parameter 110 is performed regularly, but continuous recording of the first event parameter 110 is performed when a second event parameter 110 is detected. Furthermore, it is envisioned that most data would only be stored in the memory device 40 during a "driving campaign". After each driving campaign has concluded, certain event parameter 110 data is recorded over by new event parameter 110 data of the subsequent driving campaign. This vastly reduces the amount of virtual data space required by purging unnecessary data. A driving campaign for headlight and windshield wiper operation would preferably be defined by the time duration between turning the vehicle 11 turned on and off, whereas the driving campaign for braking would preferably be defined by the time duration between acceleration from zero miles per hour (0 mph) to deceleration to zero miles per hour (0 mph). Nonetheless, a driving campaign, and the purging of certain event parameters 110, would depend upon the event parameter 110 and the type of analysis the software 100 is performing.

In addition to recording and analyzing event parameter 110 data, the system 10 is provided with collision alert 120. The collision alert 120 implemented through the software 100 as an algorithm to capitalize upon the existing monitoring sensors 50 (accelerometers, radar, lasers, etc) to detect if a collision is imminent. In this regard, the software 100 is preprogrammed with statistical and trend data that, when compared to event parameter 110 data, would provide an indication when a collision is about to occur. For instance, if the velocity vector of the vehicle 11 is detected as "x" then the time necessary to make a complete stop would be continuously compared to velocity vectors of objects approaching the vehicle 11, or the vehicle's trajectory, to determine if the vehicle 11 can come to a complete stop before the trajectories intersect. If a complete stop cannot be made then an alert is signaled via an alarm 140 to the operator of the vehicle. This alarm 140 may be a light indicator via an LED or a sound indicator via a speaker or both, which would preferably be located in the passenger compartment of the vehicle 11. Because the system 10 is recording a multitude of event parameter 110 data, the system 10 may also be exploited to incorporate an operator's typical response time into the vehicle's 11 stop time. For instance, the vehicle's 11 stop time at velocity vector "x" while object's velocity vector is "y" may be "z", but statistical analysis by the system 10 may reveal that an operator's average response time is "k" with variance "delta-k" so this response time would be factored when calculating the stop time.

The system 10 is further provided with snapshot recordation 130 that automatically records predetermined event parameters 110 upon detecting a collision or other type of damage. This snapshot 130 records and retains the event parameters 110 preceding, during, and after the collision/damage without purging the data associated with those event parameters 110, regardless of the start of a new driving campaign. As by way of example, a collision may be detected by an abnormal acceleration/deceleration or a deformation vector of a structural component. As by way of example, damage may be detected by a vibrational frequency from a vibrational sensor located on a window or by a deformation vector of a side panel. This snapshot 130 data is envisioned to be especially useful for investigators and insurance assessors/adjusters.

Figure 4:
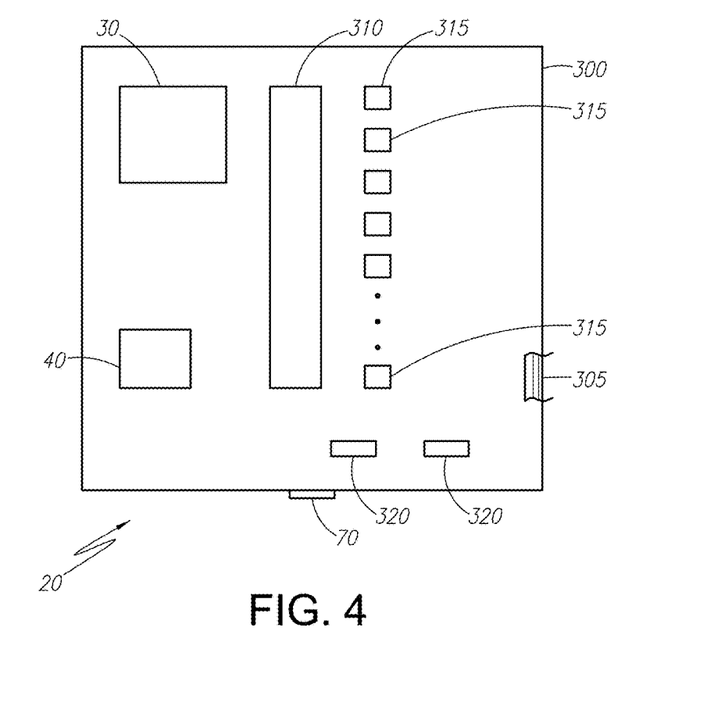
FIG. 4 is an internal view of the tamperproof box 20 as used with the system 10 in accordance with the preferred embodiment of the present invention; and, FIG. 5 is a flow chart depicting overall operational sequence of the software 100 as used with the system 10 in accordance with the preferred embodiment of the present invention.

Referring now to FIG. 4, an internal view of the tamperproof box 20 as used with the system 10 is disclosed. The tamperproof box 20 is provided in a protective enclosure 300 comprised of multiple protective layer barriers 305. The protective layer barriers 305 are envisioned to provide protection against temperature, dirt, water, moisture, dust, debris, electromagnetic interference, physical impact, and other exterior factors that could be detrimental to the electronic components contained within. Such exterior factors are envisioned to be harmful either in ordinary ambient environments or in the extreme environment of a motor vehicle crash. The protective enclosure 300 is secured by the locking mechanism 70. Access to the locking mechanism 70 is envisioned to be provided only to authorized technicians, law enforcement officials, legal entities, and the like. The processor 30 and the memory device 40 are contained within the protective enclosure 300 as aforementioned described. In addition, electronic interface to the processor 30 would be provided by an input/output interface 310. Electrical connection to the input/output interface 310 is provided by a series of connection ports 315, whose quantity would match those of the monitoring sensor 50 (as shown in FIG. 1 and FIG. 2) and/or monitoring camera 60 (as shown in FIG. 1 and FIG. 2). For added security and tamper-resistance, each connection ports 315 is envisioned to be a tamper-resistant cable terminators/connectors such as the ones disclosed and described in U.S. Pat. No. 3,845,454 and U.S. Pat. No. 5,055,060; however, other forms of signal communication and transmission may be utilized such as common electrical wiring or wireless transmission. Initial programming of the processor 30 as well as post incident access to the data contained within the memory device 40 would be provided through a series of interface ports 320. The interface ports 320 would be protected with a proprietary encryption scheme to further the tamper proof resistance of the system 10.

The software 100 is configured to acquisition data from the monitoring sensors 50 and monitoring cameras 60 either continuously or periodically via input/output functions of the processor 30. Simple arithmetic and statistical analysis may be performed via algorithmic functions executed by the processor 30 to configure the data before being stored on the memory device 40, but the data is mostly coalesced and stored in table form for acquisitioning, manipulation, and analysis by some other software program. The software 100 is further configured to purge certain data after a driving campaign has been completed.

Figure 5:
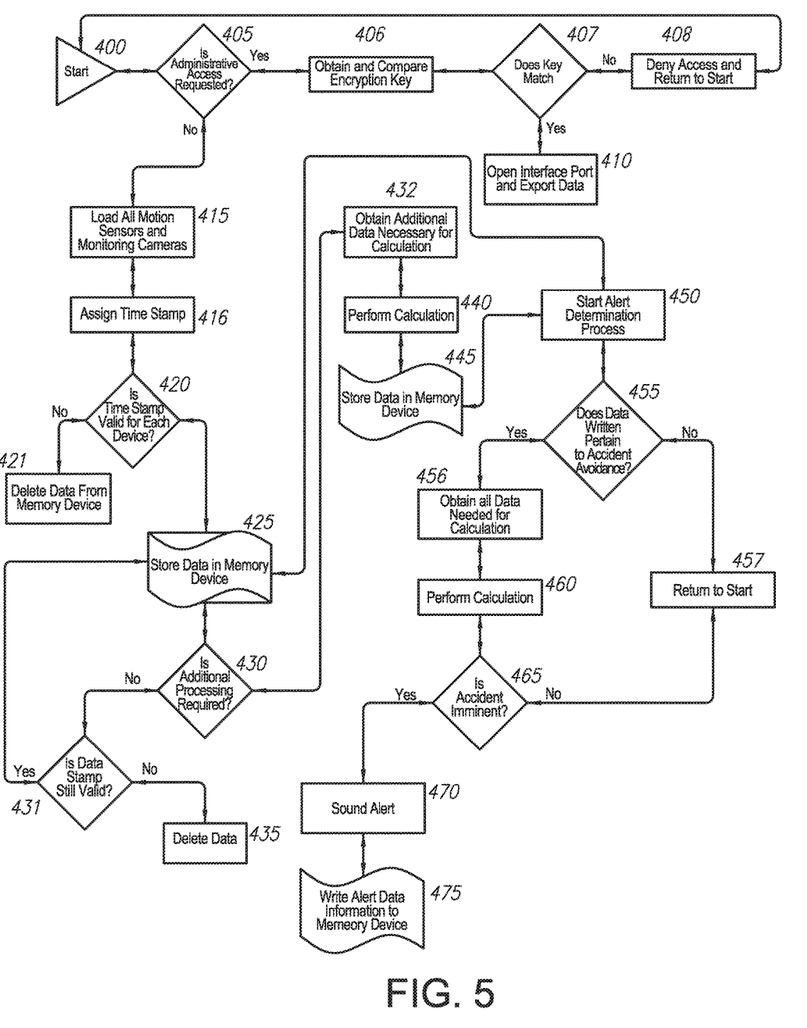

Referring next to FIG. 5, a flow diagram depicting overall operational sequence of the software 100 as used with the system 10 in accordance with the preferred embodiment of the present invention is depicted. Operation starts at a start function 400 which passes to a first decision function 405, first decision first sub function 406, first decision second sub function 407 and first decision third sub function 408 respectively. The first decision function 405 determines whether access is being requested by an authorized individual. In the event of a positive outcome, the encryption sequence is compared and a positive response provides access at a first operational function 410. A negative comparison then returns a sequence to a start function 400. Should administrative access not be required, all data from the monitoring sensors 50 (as shown in FIG. 1 and FIG. 2) and the monitoring cameras 60 (as shown in FIG. 1 and FIG. 2) are loaded at a second operational function 415, which is followed by a second operation first sub function 416 and assigned a time stamp. The time stamp requirement for each device will vary as to its last entry with some devices changing state and other not. A second operational function 420c which is followed by a second operation first sub function 421, compares time stamp data and deletes data in the event of a negative comparison. A positive comparison causes the data to be written at a first write function 425 whereas a negative comparison deletes data from the memory device designated as second operation first sub function 421. A third operation function 430 then determines if additional processing is required. Should the time stamp be invalid for that calculation, third decision first sub function 431, data is deleted at a third operation function 435. A positive outcome causes addition information to be obtained, third decision second sub function 432, and a calculation prepared at a fourth operation function 440. The resulting data, such as stopping distances, engine capabilities, obstacles, moving obstacles, and the like are then stored in the memory device 40 (as shown in FIG. 4) at a second write function 445. The data is then passed to a fifth operation function 450 which determines if certain data poses a possible danger to the equipped vehicle. A fourth decision function 455 determines if data pertains to accident avoidance. A negative response, fourth decision second sub function 457, then simply returns the user to the start function 400. A positive response provides the ability to obtain additional information such as weather conditions, location (as provided by GPS input), a fourth decision first sub function 456, and other relevant inputs and perform additional calculations at a fifth decision function 465. At this point in time, the system 10 can determine if an accident is imminent at a fifth decision function 465. If so, an alert is provided to the driver at a seventh operation function 470 and recorded to the memory device 40 (as shown in FIG. 4) at a third write function 475. A negative response at the fifth decision function 465 simply returns the sequence to the start function 400. Such a process repeats indefinitely.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized in a simple and straightforward manner with little or no training. After initial purchase or acquisition of the system 10, it would be configured as indicated in FIGS. 1 and 2.

The method of utilizing the system 10 may be achieved by performing the following steps: acquiring a model of the system 10; placing the tamperproof box 20 within a vehicle 11, preferably in an non-easily accessible location; securing a plurality of monitoring sensors 50 and monitoring cameras 60 in and around the vehicle 11; ensuring that each monitoring sensor 50 and monitoring camera 60 is in electrical communication with the processor 30 and memory device 40 of the tamperproof box 20; installing the alarm 140 of the collision alert 120 in the passenger compartment of the vehicle 11; allowing the software 100 to record and analyze event parameters 110 while operating the vehicle 11; allowing the collision alert 120 to warn an operator of the vehicle 11 if a collision is imminent; allowing the snapshot recordation 130 to record particular event parameters 110 in the event a collision/damage occurs; and, benefiting from the system's 10 ability to store data for subsequent acquisitioning, analysis, and manipulation. Such operational sequence is depicted in FIG. 5.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A data recorder system, comprising:
a box;
a processor secured within said box;
a memory device secured within said box and in electrical communication with said processor;
an input/output interface secured within said box and in electrical communication with said processor;
a plurality of connection ports in electrical communication with said input/output interface;
a plurality of interface ports in electrical communication with said memory device permitting programming of said memory device and data retrieval therefrom;
a plurality of monitoring lasers disposed disposed on a vehicle, each in communication with said processor and said memory device and configured to detect event parameter data by means of said connection ports;
a plurality of monitoring cameras disposed on said vehicle, each in communication with said processor and said memory device and configured to detect additional event parameter data by means of said connection ports;
software configured to be stored by and operated upon said processor to identify event parameters, acquisition said event parameter data, said additional event parameter data, coalesce said event parameter data and said additional event parameter data, and store said coalesced event parameter data and said additional event parameter data on said memory device;
breach sensors and breach monitors within said box, each configured to detect and record any breach that has occurred into said box and transmit said detection and recordation to said processor for storage of on said memory device; and,
encrypted access coding and breach detection algorithms to prevent and detect access to said processor and said memory device;
wherein said event parameter data and said additional event parameter data provides information regarding movement, movement relative to other objects within proximity, and environmental conditions;
wherein said software is configured to establish drive campaigns and sample, store, and purge said event parameter data and said additional event parameter data in accordance with each individual drive campaign;
wherein said box comprises a laminated construction of insulative and conductive materials;
wherein said box comprises layers of strong and hard materials;
wherein said box is provided with a locking mechanism configured to selectively grant access to said processor and said memory device and to transmit a signal to said processor and said memory device each time said locking mechanism is activated; and
wherein said communication between said plurality of monitoring lasers, said plurality of monitoring cameras, and said box is provided by coaxial cable lines and tamper-resistance cable terminators.

2. A data recorder system, comprising:
a box;
a processor secured within said box;
a memory device secured within said box and in electrical communication with said processor;
an input/output interface secured within said box and in electrical communication with said processor;
a plurality of connection ports in electrical communication with said input/output interface;
a plurality of interface ports in electrical communication with said memory device permitting programming of said memory device and data retrieval therefrom;
a plurality of monitoring lasers disposed on a vehicle, each in communication with said processor and said memory device and configured to detect event parameter data by means of said connection ports;
a plurality of monitoring cameras disposed on said vehicle, each in communication with said processor and said memory device and configured to detect additional event parameter data by means of said connection ports;
software configured to be stored by and operated upon said processor to identify event parameters, acquisition said event parameter data, said additional event parameter data, coalesce said event parameter data and said additional event parameter data, and store said coalesced event parameter data and said additional event parameter data on said memory device;
breach sensors and breach monitors within said box, each configured to detect and record any breach that has occurred into said box and transmit said detection and recordation to said processor for storage of on said memory device; and,
encrypted access coding and breach detection algorithms to prevent and detect access to said processor and said memory device;
wherein said event parameter data and said additional event parameter data provides information regarding movement, movement relative to other objects within proximity, and environmental conditions;
wherein said software is configured to establish drive campaigns and sample, store, and purge said event parameter data and said additional event parameter data in accordance with each individual drive campaign;
wherein said software is configured to detect imminent collision with other objects through a collision alert algorithm and provide warnings thereof via communication with an alarm;
wherein said software is configured to store event parameter data and said additional event parameter data without purging said event parameter data and said additional event parameter data through a snapshot recordation algorithm when damage has been detected;
wherein said box comprises a laminated construction of insulative and conductive materials;
wherein said box comprises layers of strong and hard materials;
wherein said box is provided with a locking mechanism configured to selectively grant access to said processor and said memory device and to transmit a signal to said processor and said memory device each time said locking mechanism is activated; and,
wherein said communication between said plurality of monitoring lasers, said plurality of monitoring cameras, and said box is provided by coaxial cable lines and tamper-resistance cable terminators.

* * * * *